US008502998B2

(12) United States Patent
Togawa

(10) Patent No.: US 8,502,998 B2
(45) Date of Patent: Aug. 6, 2013

(54) IMAGE FORMING APPARATUS AND CONTROL METHOD OF IMAGE FORMING APPARATUS REQUIRING A WARM-UP OF A PREDETERMINED TIME

(75) Inventor: Takanori Togawa, Tachikawa (JP)

(73) Assignee: Konica Minolta Business Technologies, Inc. (JP)

( * ) Notice: Subject to any disclaimer, the term of this patent is extended or adjusted under 35 U.S.C. 154(b) by 287 days.

(21) Appl. No.: 12/903,443

(22) Filed: Oct. 13, 2010

(65) Prior Publication Data

US 2011/0090517 A1      Apr. 21, 2011

(30) Foreign Application Priority Data

Oct. 21, 2009   (JP) .................................. 2009-241933

(51) Int. Cl.
    *G06F 3/12*      (2006.01)
(52) U.S. Cl.
    USPC .......... 358/1.13; 358/1.1; 358/1.14; 358/1.15
(58) Field of Classification Search
    USPC ....................................... 358/1.14, 1.15, 1.18
    See application file for complete search history.

(56) References Cited

U.S. PATENT DOCUMENTS

| 6,094,546 | A  | * | 7/2000  | Nakazato et al. | 399/1    |
|-----------|----|---|---------|-----------------|----------|
| 6,219,502 | B1 | * | 4/2001  | Osari et al.    | 399/82   |
| 6,347,203 | B1 | * | 2/2002  | Kutsuwada       | 399/82   |
| 2007/0242301 | A1 | * | 10/2007 | Tsuchie et al. | 358/1.14 |
| 2008/0098395 | A1 | * | 4/2008  | Backer          | 718/102  |

FOREIGN PATENT DOCUMENTS

JP      2007-163559 A      6/2007

* cited by examiner

*Primary Examiner* — Benny Q Tieu
*Assistant Examiner* — Quyen V Ngo
(74) *Attorney, Agent, or Firm* — Cantor Colburn LLP

(57) ABSTRACT

Disclosed is an image forming apparatus including a processing device to carry out a predetermined process to a sheet in which an image is formed, the processing device requiring a warm-up of a predetermined time, a control unit to specify a warm-up completion time, to input a plurality of jobs according to a predetermined inputting operation of an operator, to specify whether the inputted job is a first job or a second job, to specify a processing time of the second job which is inputted, and to decide an execution order of the plurality of jobs so that the second job is to be executed in preference to the first job until the warm-up completion time elapses from start of a job execution and an image forming unit to orderly execute the jobs according to the execution order of the plurality of jobs which is decided by the control unit.

11 Claims, 13 Drawing Sheets

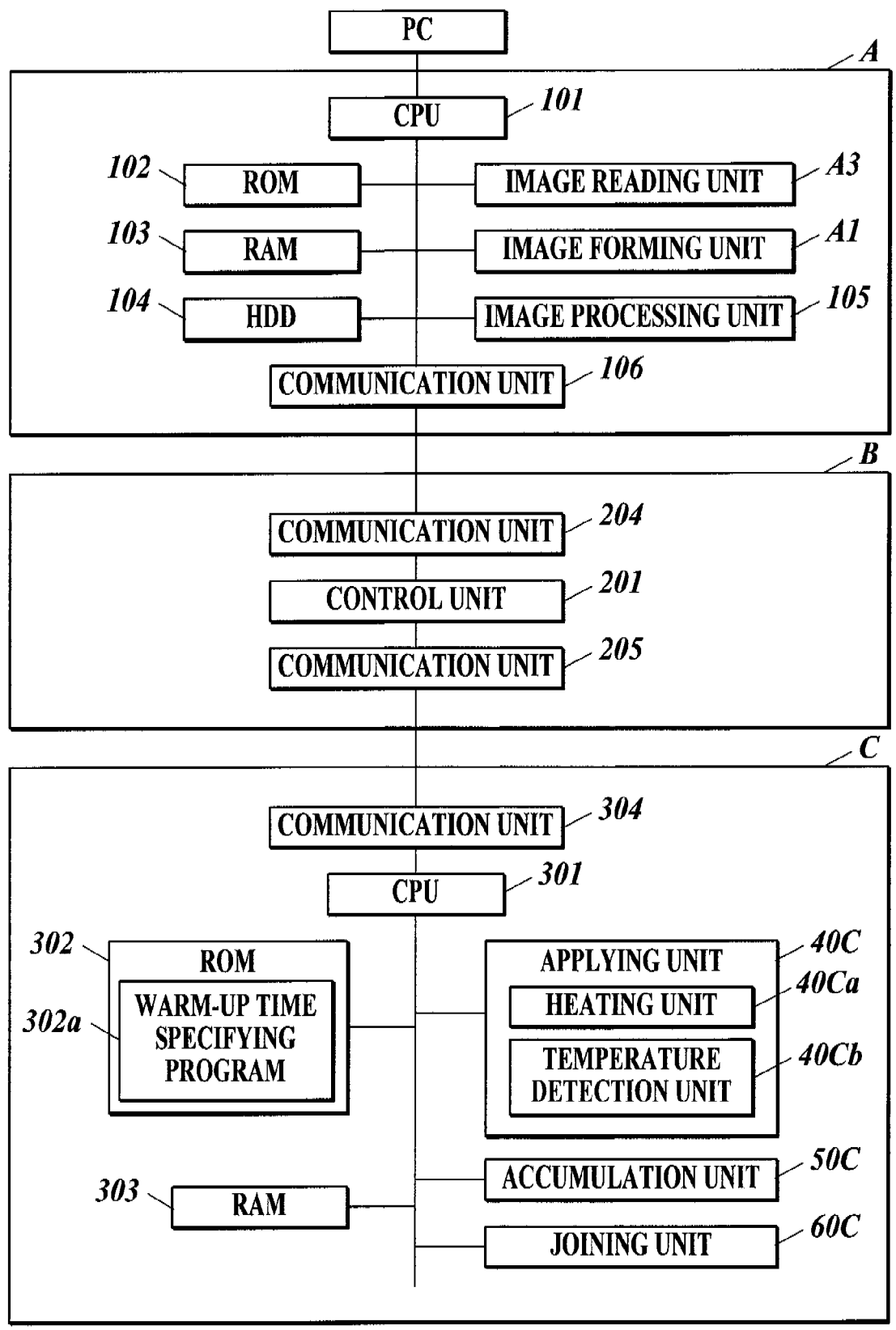

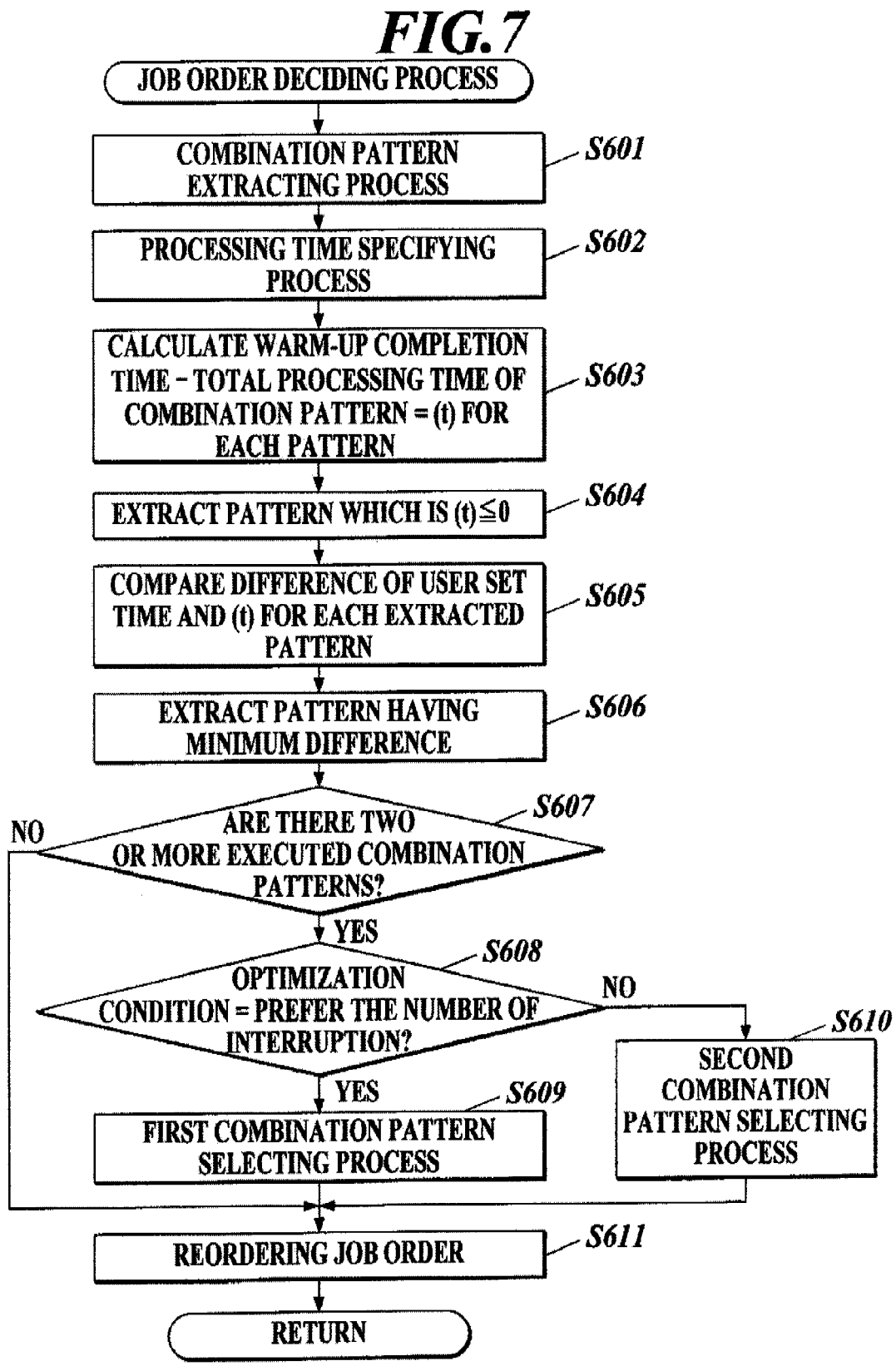

FIG.8A

| a | b | c | d | e |
|---|---|---|---|---|

FIG.8B

| a:(1)−1 | b:(2)−1 | c:(1)−2 | d:(2)−2 | e:(2)−3 |
|---|---|---|---|---|

FIG.8C

| a:(1)−1<br>5MINUTES | b:(2)−1<br>12MINUTES | c:(1)−2<br>8MINUTES | d:(2)−2<br>3MINUTES | e:(2)−3<br>9MINUTES |
|---|---|---|---|---|

FIG.9

| | | | | | WARM-UP COMPLETION TIME | |
|---|---|---|---|---|---|---|
| | | | | | 10 MINUTES | |

| | | | e:(2)-3 9MINUTES | | | |
|---|---|---|---|---|---|---|
| | | d:(2)-2 3MINUTES | d:(2)-2 3MINUTES | | | |
| | b:(2)-1 12MINUTES | b:(2)-1 12MINUTES | b:(2)-1 12MINUTES | d:(2)-2 3MINUTES | d:(2)-2 3MINUTES<br>e:(2)-3 9MINUTES | e:(2)-3 9MINUTES |
| | COMBINATION 1 | COMBINATION 2 | COMBINATION 3 | COMBINATION 4 | COMBINATION 5 | COMBINATION 6 |

| DIFFERENCE BETWEEN WARM-UP COMPLETION TIME | -2MINUTES | -5MINUTES | -14MINUTES | 7MINUTES | -2MINUTES | 1MINUTES |
|---|---|---|---|---|---|---|
| TOTAL | 12MINUTES | 15MINUTES | 24MINUTES | 3MINUTES | 12MINUTES | 9MINUTES |

FIG.10

| | | | | USER SET TIME DIFFERENCE |
|---|---|---|---|---|
| | | | | -2MINUTES |

| | | | | | DIFFERENCE BETWEEN WARM-UP COMPLETION TIME | TOTAL |
|---|---|---|---|---|---|---|
| COMBINATION 1 | b:(2)-1 12MINUTES | | | | -2MINUTES | 12MINUTES |
| COMBINATION 2 | b:(2)-1 12MINUTES | d:(2)-2 3MINUTES | | | -5MINUTES | 15MINUTES |
| COMBINATION 3 | b:(2)-1 12MINUTES | d:(2)-2 3MINUTES | e:(2)-3 9MINUTES | | -14MINUTES | 24MINUTES |
| COMBINATION 5 | d:(2)-2 3MINUTES | e:(2)-3 9MINUTES | | | -2MINUTES | 12MINUTES |

FIG.11

| | | | TOTAL | DIFFERENCE BETWEEN WARM-UP COMPLETION TIME |
|---|---|---|---|---|
| COMBINATION 1 | b:(2)-1 12MINUTES | | 12MINUTES | -2MINUTES |
| COMBINATION 5 | d:(2)-2 3MINUTES | e:(2)-3 9MINUTES | 12MINUTES | -2MINUTES |

IMAGE FORMING APPARATUS AND CONTROL METHOD OF IMAGE FORMING APPARATUS REQUIRING A WARM-UP OF A PREDETERMINED TIME

BACKGROUND OF THE INVENTION

1. Field of the Invention

The present invention relates to an image forming apparatus and a control method of the image forming apparatus.

2. Description of Related Art

Conventionally, an image forming apparatus including a processing device which carries out a post-processing such as bookbinding and the like has been used.

For the above object, a high speed image forming apparatus with high capacity is generally used and can be effectively applied to other objects which are needed in an office other than bookbinding. Therefore, two types of operation modes of an image forming operation with bookbinding and an image forming operation without bookbinding are carried out by using the above image forming apparatus. Usually, the high speed image forming apparatus with high capacity sets a plurality of image forming operation contents (called job setting) in advance and has a function for orderly executing the plurality of jobs which are set.

In such image forming apparatus, in some jobs, a process which is to be carried out by a processing device which needs warm-up is required in the image forming operation. When the warm-up is not completed upon executing such job, the job and all of jobs to be executed after the job are to be on standby until the warm-up is completed, and this is very inefficient.

In order to solve the above problem, an image forming apparatus which calculates a processing time of jobs in which a post-processing that requires warm-up is not carried out (hereinafter, called warm-up unneeded job) among the set jobs and which also calculates the warm-up completion time of the post-processing device, and in which, when there are the warm-up unneeded job which does not exceed the warm-up completion time, the job is made to be executed in preference to other jobs to enhance efficiency of the image forming apparatus by making other job be executable during the warm-up is shown in JP2007-163559.

SUMMARY OF THE INVENTION

However, in the image forming apparatus described in the above JP2007-163559, the execution order of the jobs is changed only when it is determined that the job does not exceed the warm-up completion time. Therefore, there still exists a period of time (a play time) where none of the jobs is to be executed during the warm-up. Since energy cost and personal cost occur during the playtime, efficiency of the image forming apparatus is not perfect overall.

According to a first aspect of the present invention there is provided an image forming apparatus including a processing device to carryout a predetermined process to a sheet in which an image is formed, the processing device requiring a warm-up of a predetermined time, a control unit to specify a warm-up completion time which is a time needed until the processing device completes the warm-up, to input a plurality of jobs according to a predetermined inputting operation of an operator, to specify whether the inputted job is a first job in which a process by the processing device is needed or a second job in which the process by the processing device is not carried out with regards to the inputted jobs, to specify a processing time of the second job which is inputted, and to decide an execution order of the plurality of jobs so that the second job is to be executed in preference to the first job until the warm-up completion time elapses from start of a job execution and an image forming unit to orderly execute the jobs according to the execution order of the plurality of jobs which is decided by the control unit.

Preferably, when a plurality of the second jobs are inputted, the control unit extracts a plurality of combination patterns of one or a plurality of the second jobs and specifies a total processing time for each of all of the extracted combination patterns, the control unit selects a combination pattern in which the total processing time satisfies a condition set based on the warm-up completion time among all of the extracted combination patterns, and the control unit decides an execution order of the plurality of jobs so that the one or the plurality of the second jobs corresponding to the selected combination pattern is executed in preference to other jobs.

Preferably, when there exist a plurality of combination patterns in which the total processing time satisfies the condition set based on the warm-up completion time within all of the extracted combination patterns, the control unit selects a combination pattern which includes the most number of the second jobs.

Preferably, the control unit sets an input order of the jobs according to an inputting operation of the operator, and when there exist a plurality of combination patterns in which the total processing time satisfies the condition set based on the warm-up completion time within all of the extracted combination patters, the control unit selects a combination pattern which includes the second job which is ahead in the input order based on the input order of the jobs.

Preferably, the control unit sets an input order of the jobs according to an inputting operation of the operator, and when there exist a plurality of combination patterns in which the total processing time satisfies the condition set based on the warm-up completion time within all of the extracted combination patters, the control unit selects a combination pattern which includes the most number of the second jobs or a combination pattern which includes the second job which is ahead in the input order based on the input order of the jobs according to a selecting operation of the operator.

Preferably, the control unit allows an additional input of a job even after the execution order of the jobs is decided and re-decides the execution order of the jobs when the additional input of the job is carried out.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 4 is a control block diagram of the image forming system;

FIG. 7 is a flowchart showing a process for deciding an execution order of jobs;

FIG. 8A is a diagram for explaining the process for deciding the execution order of jobs;

FIG. 8B is a diagram for explaining the process for deciding the execution order of jobs;

FIG. 8C is a diagram for explaining the process for deciding the execution order of jobs;

FIG. 9 is a diagram for explaining the process for deciding the execution order of jobs;

FIG. 10 is a diagram for explaining the process for deciding the execution order of jobs;

FIG. 11 is a diagram for explaining the process for deciding the execution order of jobs;

DESCRIPTION OF THE PREFERRED EMBODIMENTS

Figure 1:
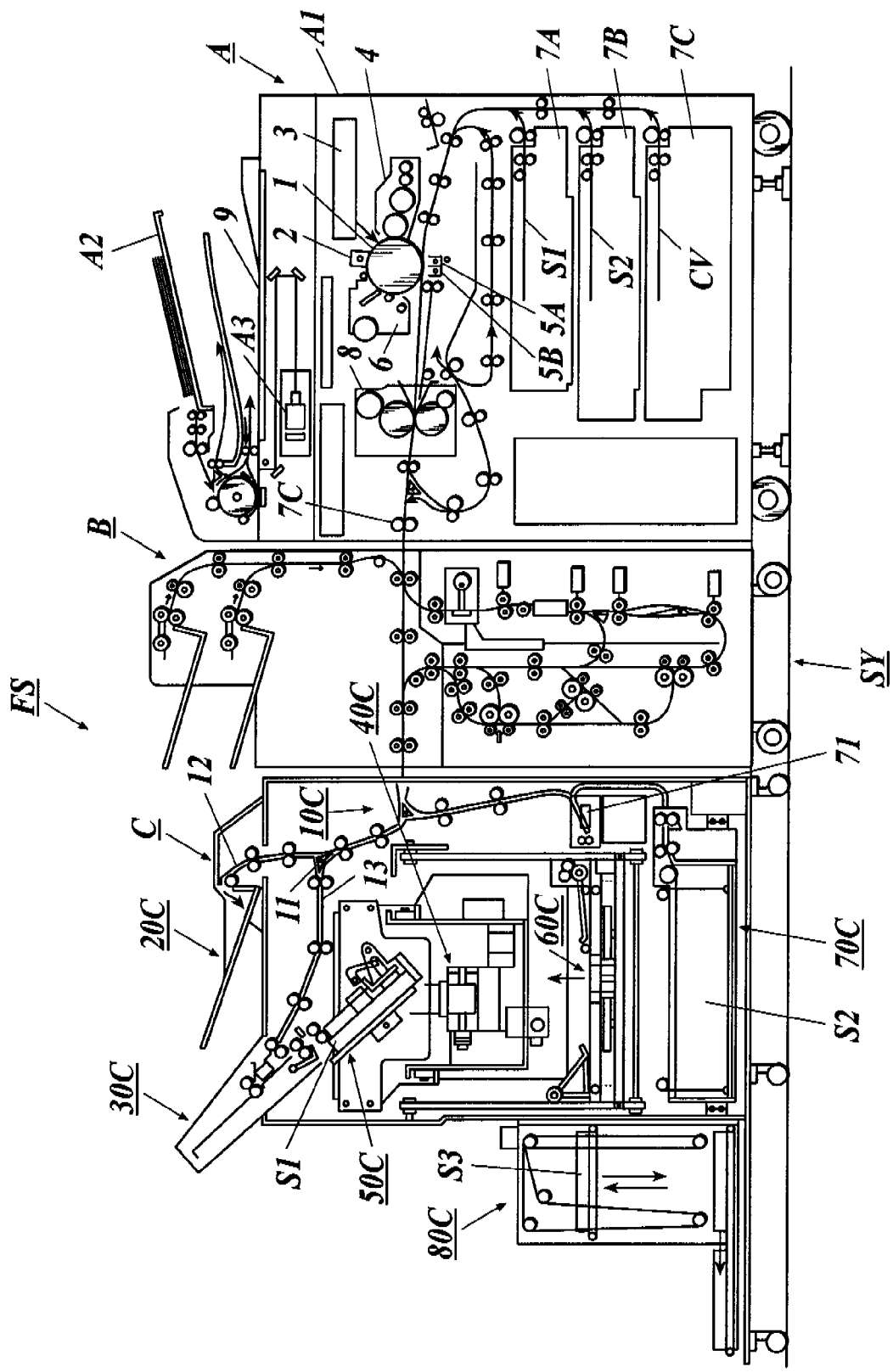
FIG. 1 is an overall configuration diagram of an image forming system.

Hereinafter, the first embodiment of the present invention will be described with reference to the drawings. Here, the scope of the present invention is not limited to the examples shown in the drawings.

Moreover, in the embodiment of the present invention, all of the constituting devices as a whole is called an image forming system. However, a part of or all of the devices constituting the image forming system may be called as image forming apparatus.

As shown in FIG. 1, the image forming system SY includes an image forming apparatus A and a sheet processing apparatus FS, for example. Further, the sheet processing apparatus FS is constituted with a folding processing apparatus B and a bookbinding apparatus C.

The image forming apparatus A forms an image on a sheet S1 and the like by an electrographic method, and the image forming apparatus A includes an image forming unit A1, a document conveying unit A2 and an image reading unit A3. In the image forming unit A1, a charging section 2, an exposure section 3, a development section 4, a transfer section 5A, a separation section 5B and a cleaning section 6 are disposed at periphery of a photoreceptor 1 of a drum shape, and each process of charging, exposure, development and transfer is executed to form a toner image on the sheet S1 and the like.

The sheet S1 which is to be covered with a front cover S2 when a booklet is generated is housed in a paper feeding tray 7A and the front cover S2 is housed in a paper feeding tray 7B and a front cover housing section 70C of the bookbinding apparatus C. Further, a cover sheet CV which covers the booklet which is generated by the bookbinding apparatus C is housed in a paper feeding tray 7C.

The sheet S1 and the like is ejected one by one from the paper feeding tray 7A and the like and is conveyed to the image forming unit A1. The sheet S1 and the like in which a toner image is transferred passes through the fixing section 8 so that the fixing process is carried out. The sheet S1 and the like to which the fixing process is carried out is ejected outside the image forming apparatus A from the paper ejecting roller 7C.

Here, the image forming apparatus A in the embodiment forms a monochrome image on a sheet by an electrographic method. However, the image forming apparatus according to the present invention is not limited to the embodiment, and it is needless to say that the image forming apparatus may be a color image forming apparatus. Further, the image forming method may be any image forming method other than the electrographic method.

The folding processing apparatus B is constituted with a hole punching unit, a first folding processing unit, a second folding processing unit, a third folding processing unit and the like, for example, and the folding processing apparatus B executes a hole punching process, various types of folding processes and the like to the sheet S1 and the like in which an image is formed.

The bookbinding apparatus C makes a bundle of sheets by bundling a plurality of sheets of sheet S1 which are sent from the folding processing apparatus B and generates a booklet by joining the front cover S2 with the bundle and by covering the bundle of sheets with the front cover in a U shape.

Figure 2:
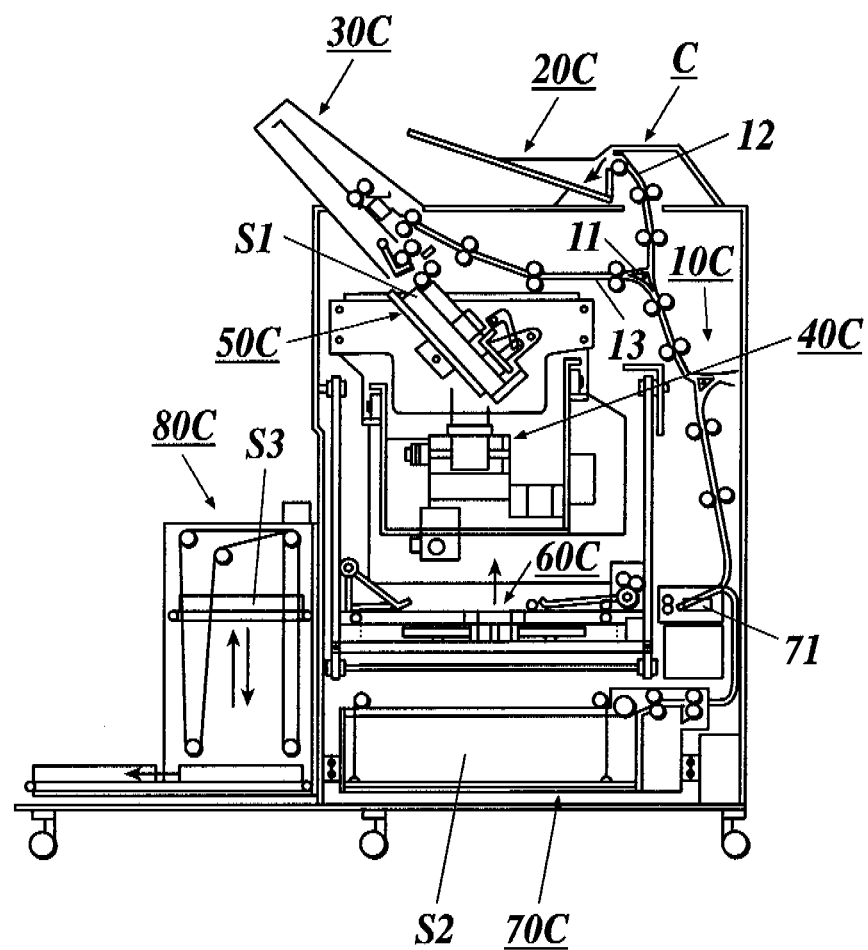
FIG. 2 is a configuration diagram of a bookbinding device.

As shown in FIG. 2, the bookbinding apparatus C includes a conveyance unit 10C, a paper ejection tray 20C, a sheet inverting unit 30C, an applying unit 40C as a processing device, an accumulation unit 50C, a joining unit 60C (booklet generating unit) for joining the front cover with the bundle of sheets, a front cover paper housing unit 70C and a book ejection unit 80C, for example. The sheets S1 which are conveyed to the bookbinding apparatus C is ejected to the paper ejection tray 20C via the paper ejection path 12 or are conveyed to the sheet inverting unit 30C by the switching gate 11 provided at the conveyance unit 10C. In the paper ejection tray 20C, the sheets S1 of the case where bookbinding is not carried out in the bookbinding apparatus C and the cover sheet CV to which a folding processing is carried out in the folding processing apparatus B are to be ejected. In the bookbinding apparatus C, the sheets S1 are conveyed to the sheet inverting unit 30C via the conveyance path 13 and are conveyed to the accumulation unit 50C after being switched back in the sheet inverting unit 30C. A set number of sheets S1 are accumulated in the accumulation unit 50C, and when the sheets S1 reaches the set number, the accumulation unit 50C rotates and the bundle of sheets S1 is to be maintained in an approximately vertical state. Then, adhesive is applied to the under surface which is the spine of the bundle of sheets S1, and a cover paper S2 contacts the bundle of sheets S1 to be adhered. The booklet S3 which is generated by the cover paper S2 being adhered to the bundle of sheets S1 is ejected to the book ejection unit 8. The cover paper S2 is housed in the cover paper housing unit 70C other than the paper feeding tray 7B. When forming an image on the cover paper S2, the cover paper S2 is ejected from the paper feeding tray 7B, and when an image is not to be formed on the cover paper S2, the cover paper S2 is ejected from the cover paper housing unit 70C. When the cover paper S2 is an irregular size which is long, the cover paper S2 is to be cut by a cutter 71 in a predetermined length according to size information of the sheet S1 and thickness information of the bundle of sheets S1.

Next, with reference to FIG. 3, the process for applying the adhesive to the bundle of sheets S1 will be described.

When the second sandwiching member 503 moves toward the sheets S1 by the motor M1 and when the second sandwiching member 503 pushes the sheets S1 with a predetermined pressure, moving of the second sandwiching member 503 stops by the driving torque detection sensor detecting an increasing of driving torque of the motor M1. By the above structure, the bundle of sheets S1 is tightly sandwiched by the first sandwiching member 502 and the second sandwiching member 503. The moving amount of the second sandwiching member 503 is measured by the encoder 509 and is stored in the RAM or the like.

Figure 3A:
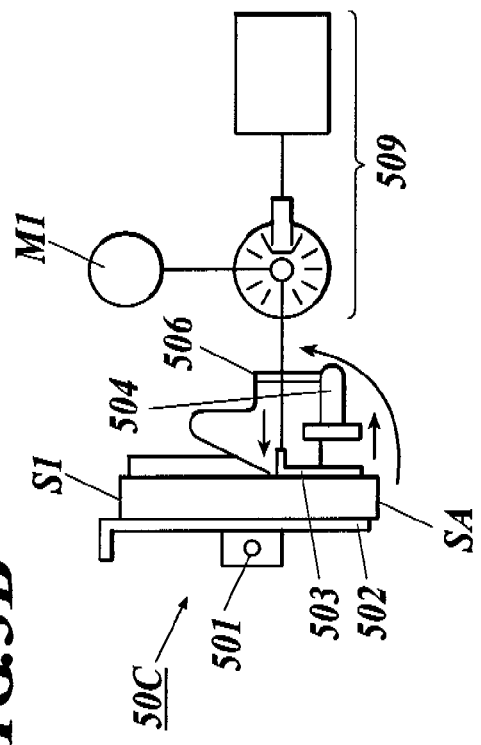
FIG. 3A is a diagram showing a process for applying an adhesive to a bundle of sheets.
Figure 3B:
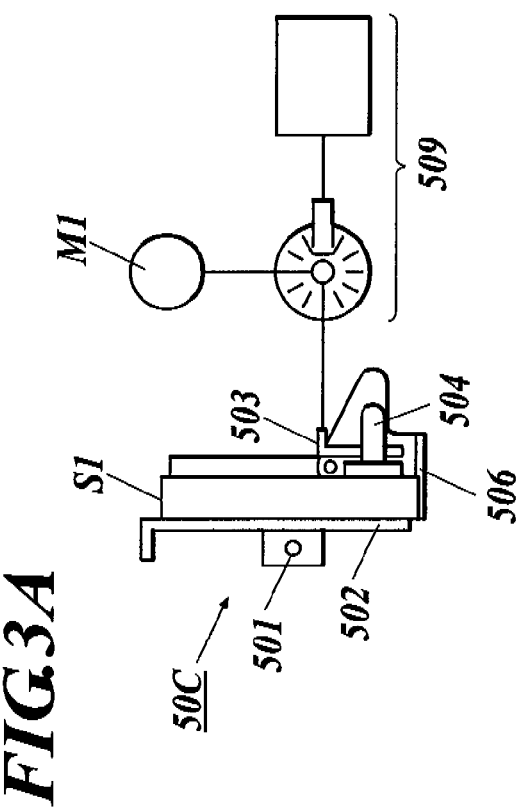
FIG. 3B is a diagram showing a process for applying the adhesive to the bundle of sheets.
Figure 3C:
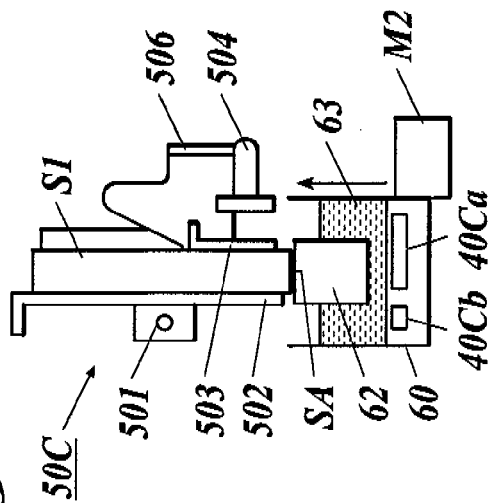
FIG. 3C is a diagram showing a process for applying the adhesive to the bundle of sheets.

At the time when the sheets S1 are sandwiched by the first sandwiching member 502 and the second sandwiching member 503, the receiving plate 506 rotates for 90 degrees and retreats as shown in FIG. 3B. At the time when the receiving plate 506 retreats, the under surface SA of the bundle of sheets S1 and the applying roller 62 are not contacting each other (see FIG. 3C).

Figure 3D:
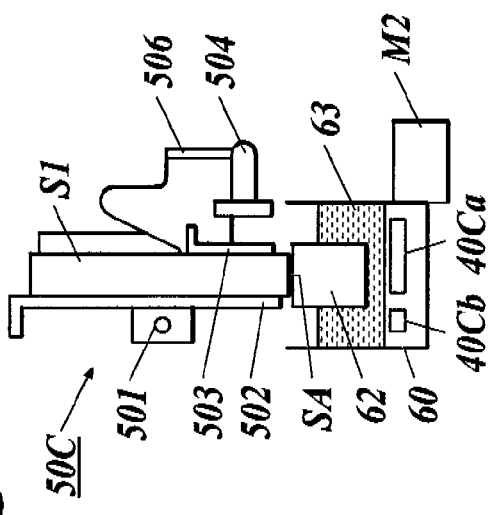
FIG. 3D is a diagram showing a process for applying the adhesive to the bundle of sheets.

Next, as shown in FIG. 3D, the applying unit 40C in which the adhesive 63 is housed rises so that the applying roller 62 contacts the under surface SA which is the spine of the bundle of sheets S1. Further, by the applying unit 40C moving along the under surface SA of the bundle of the sheets S1, the adhesive 63 is applied to the under surface SA of the bundle of the sheets S1. The applying roller 62 is driven by the motor M2.

Here, the adhesive 63 which is used in the embodiment of the present invention is a water-based emulsion paste such as vinyl acetate resin series and the like, for example, and the viscosity is 750 to 1500 mPa·s at normal temperature. The sheets S1 which is adhered by this water-based adhesive 63 can be used as recycling paper.

The applying unit 40C includes a heating unit 40Ca and a temperature detection unit 40Cb. In the applying unit 40C, the adhesive 63 is heated to a predetermined temperature so as to have a certain viscosity by the heating unit 40Ca and the temperature detection unit 40Cb, and the housing temperature is controlled so that the adhesive 63 maintains the viscosity.

The time needed until the adhesive 63 reaches a certain temperature so as to be usable for generating a booklet is a rate-limiting time for warm-up in the bookbinding apparatus C. The warm-up time (for example, 15 to 20 minutes) is long comparing to the warm-up time of the image forming apparatus A (for example, 5 minutes).

Therefore, in a case where a plurality of jobs are set and where the job which is set first is a job in which the above described bookbinding process is to be carried out, a condition where the image forming operation cannot be started until the warm-up of the bookbinding apparatus C is completed even when the warm-up of the image forming apparatus A is completed occurs. The image forming apparatus A can carry out a great amount of image forming process in a short period of time. Therefore, this waiting time is a great problem considering efficient use of the image forming apparatus.

Next, an image forming apparatus which solves the above problem and a control method of the image forming apparatus will be described.

As shown in FIG. 4, the image forming apparatus A, the folding processing apparatus B and the bookbinding apparatus C are electrically connected via the communication units 106, 204, 205 and 304, for example, and the control signal is received between each other. Further, the image forming apparatus A is electrically connected with a PC (Personal Computer).

The CPU (Central Processing Unit) 101 which functions as a control unit controls the operation of the entire image forming apparatus A, and the CPU 101 is connected with a ROM (Read Only Memory) 102, a RAM (Random Access Memory) 103, a HDD (Hard Disc Drive) 104 and the like. The CPU 101 reads the after-mentioned various types of control programs which are stored in the ROM 102 and expands the control programs in the RAM 103 to control the operation of each unit such as the image forming unit A1, the image reading unit A3, the image processing unit 105 and the like. Further, the CPU 101 executes various types of processes according to the programs expanded in the RAM 103 and stores the processing results thereof in the RAM 103. Then, the CPU 101 makes a predetermined destination to save store the processing results which are stored in the RAM 103. Furthermore, various types of data are stored in the HDD 104 and the data are arbitrarily read and written.

The control unit 201 of the folding processing apparatus B controls the operation of the entire folding processing apparatus B and controls the operation of the hole punching unit, the first folding processing unit and the like which are not shown in the drawing.

The CPU 301 of the bookbinding apparatus C controls the operation of the entire bookbinding apparatus C and is connected with the ROM 302, the RAM 303 and the like. The CPU 301 reads various types of control programs which are stored in the ROM 302 and expands the control programs in the RAM 303 to control the operation of the applying unit 40C, the accumulation unit 50C, the joining unit 60C and the like. Further, the CPU 301 executes various types of processes according to the programs expanded in the RAM 303 and stores the processing results thereof in the RAM 303. Furthermore, the CPU 301 makes a predetermined destination to save store the processing results which are stored in the RAM 303.

In the ROM 302, a warm-up time specifying program 302a is stored. The warm-up time specifying program 302a is a program for specifying a warm-up completion time which is a time needed until the warm-up of the applying unit 40C as a processing device is completed. In particular, the warm-up time specifying program 302a is a program for specifying the time (the warm-up completion time) needed to make the adhesive 63 reache the certain temperature from the temperature shown by the temperature detection unit 40Cb when a command for requesting warm-up completion time information is received from the image forming apparatus A and for transmitting the information to the image forming apparatus A. Here, as for the method to specify the time needed to make the adhesive 63 reach the certain temperature from the temperature shown by the temperature detection unit 40Cb, for example, a predetermined table is referred to and a time corresponding to a difference of a detected temperature and a goal temperature is read from the table. Here, the time can be calculated by multiplying a predetermined coefficient to the temperature shown in the temperature detection unit 40Cb. Further, the time can be calculated by multiplying a surrounding temperature coefficient to a predetermined time calculation formula.

Next, the control programs which are stored in the ROM 102 of the image forming apparatus A will be described.

Figure 5:
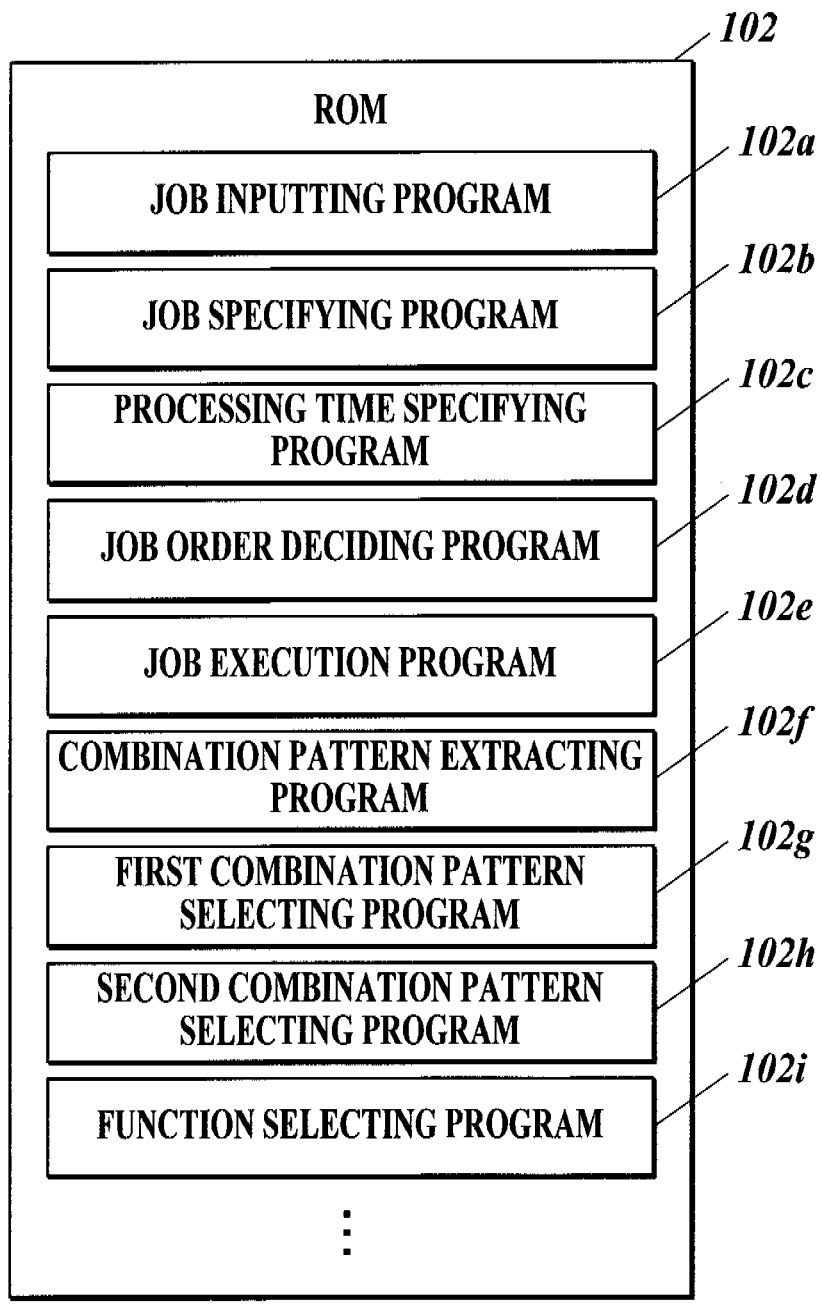
FIG. 5 is a diagram showing programs which are stored in a ROM of an image forming device.

As shown in FIG. 5, in the ROM 102, various types of control programs such as a job inputting program 102a, a job specifying program 102b, a processing time specifying program 102c, a job order deciding program 102d, a job execution program 102e, a combination pattern extracting program 102f, a first combination pattern selecting program 102g, a second combination pattern selecting program 102h, a function selecting program 102i and the like, for example.

The job inputting program 102a is a program for receiving a plurality of jobs when the jobs are inputted by an operator or the like operating a PC (see FIG. 4) or an operation unit (omitted from the drawing) which is provided at the image forming apparatus A and for storing the contents of the jobs in the RAM 103, for example. That is, the job inputting program 102a is a program for inputting a plurality of jobs according to a predetermined inputting operation of an operator. Further, the job inputting program 102a includes a program for setting an input order of the plurality of jobs according to the inputting operation by an operator.

The job specifying program 102b is a program for specifying whether the inputted job is a job in which the applying process by the applying unit 40C is needed such as the above described bookbinding process and the like (the first job or job type 1) or a job in which the applying process by the applying unit 40C is not needed such as a straight paper ejection and the like (the second job or job type 2) for each job from the inputted content of the job which is stored in the RAM 103 by the CPU 101 executing the job inputting program 102a. That is, the job specifying program 102b is a program for specifying whether the job is the first job in which a process by the processing device is needed or the second job in which a process by the processing device is not needed for the inputted jobs.

The processing time specifying program 102c is a program for calculating a processing expected time which is a time may be needed from start of execution to completion of the job in which the applying process is not needed for each job. That is, the processing time specifying program 102c is a program for specifying a processing time of the second jobs. Here, the processing expected time of the job in which the applying process is not needed is calculated by a predetermined algorithm by a number of sheets to be printed, a paper size, a processing content and the like, for example. Here, a method for specifying the processing expected time is not limited to the above described calculation, and for example, by using a table which is structured so that a predetermined time is read out corresponding to the job content, the processing expected time may be specified based on the table.

Moreover, the processing time specifying program 102c also includes a program for calculating a processing expected total time for each of all of the job combination patterns which are extracted by the after-mentioned combination pattern extracting program 102f being executed.

Although it will be described in detail later, the job order deciding program 102d is a program for deciding execution order of the jobs which are stored in the RAM 103 so that the jobs in which the applying process is not needed are to be preferentially executed until the warm-up completion time elapses based on the processing expected time of the jobs in which the applying process is not needed, which is specified by the CPU 101 executing the processing time specifying program 102c, and the warm-up completion time information which is transmitted from the bookbinding apparatus C. That is, the job order deciding program 102d is a program for deciding the execution order of a plurality of jobs so that the second jobs are to be executed in preference to the first jobs until the warm-up completion time elapses from the start of the job execution.

The job execution program 102e is a program to make the image forming unit execute the jobs according to the order decided by the CPU 101 executing the job order deciding program 102d.

Although it will be described in detail later, the combination pattern extracting program 102f is a program for extracting a plurality of combination patterns of one or a plurality of the second jobs when a plurality of jobs (the second jobs) in which the applying process is not needed are inputted by the CPU 101 executing the job inputting program 102a. That is, the combination pattern extracting program 102f is a program for extracting a plurality of combination patterns of one or a plurality of the second jobs when a plurality of the second jobs are inputted.

The first combination pattern selecting program 102g is a program for selecting a combination pattern which includes the most number of the second jobs which is to be preferentially executed among all of the combination patterns that satisfies the condition set based on the warm-up completion time within the combination patterns of the jobs which are extracted by the CPU 101 executing the combination pattern extracting program 102f, in time of deciding the job order. As described later, the first combination pattern selecting program 102g is a program which is executed alternatively with the second combination pattern selecting program 102h by a selecting operation by an operator.

The second combination pattern selecting program 102h is a program for selecting a combination pattern including the second job which is ahead in the input order based on the input order of the jobs which is set by the execution of the job inputting program 102a among all of the combination patterns that satisfies the condition set based on the warm-up completion time within the combination patterns of the jobs which are extracted by the CPU 101 executing the combination pattern extracting program 102f, in time of deciding the job order.

The function selecting program 102i is a program for selecting whether to set the mode for controlling so that the combination pattern which includes the most number of the second jobs which are to be preferentially executed is to be selected or to set the mode for controlling so that the combination pattern including the second job which is ahead in the order is to be selected by an operator operating a PC or an operation unit (not shown in the drawing) of the image forming apparatus. The function selecting program 102i is a program to be executed by the CPU 101 by an operator carrying out a predetermined operation by a PC or the image forming apparatus.

Figure 6:
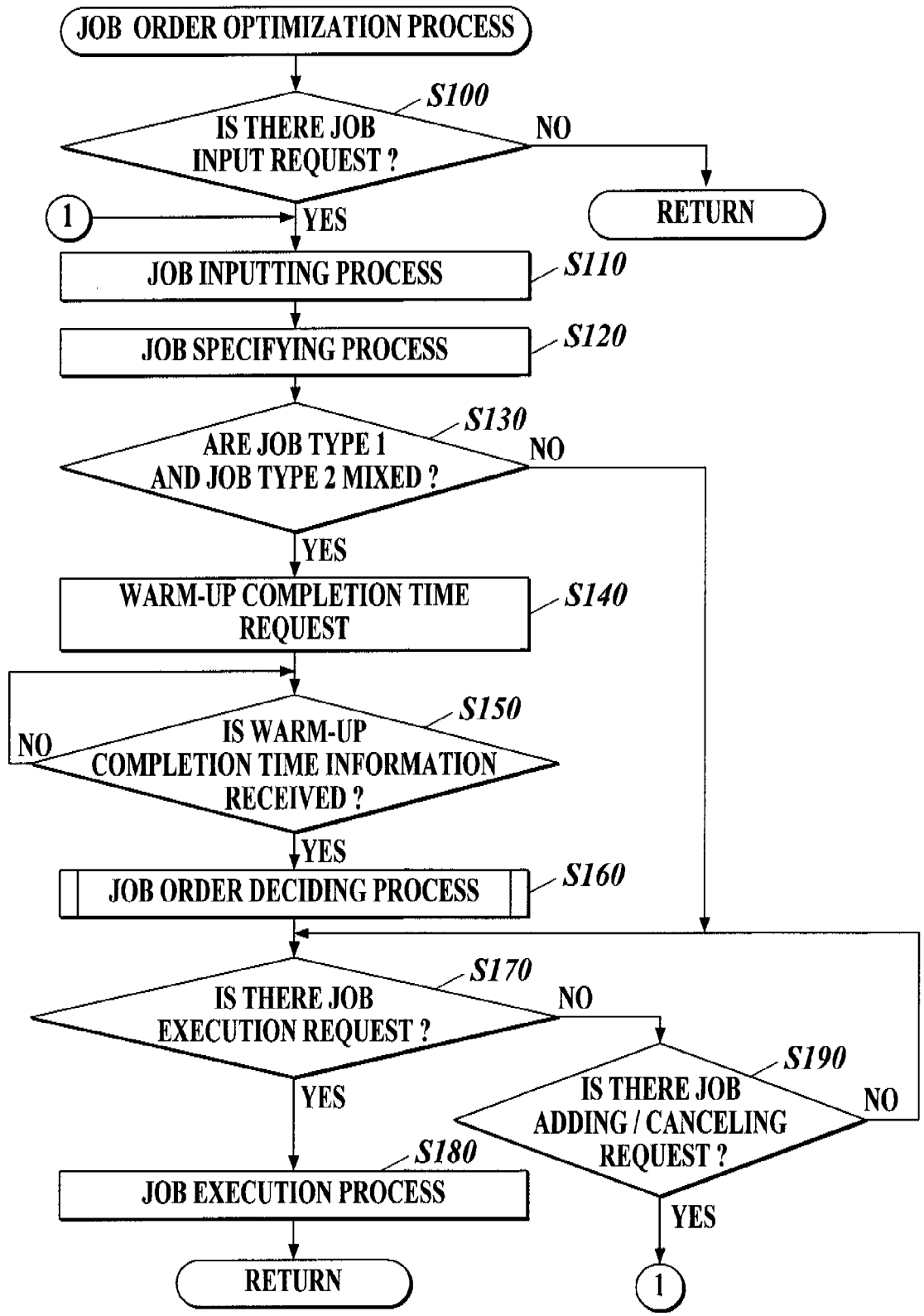
FIG. 6 is a flowchart showing a process for deciding an execution order of jobs.

Next, the process for optimizing the execution order of jobs in the image forming system SY having the above described structure will be described with reference to FIG. 6.

When the job order optimizing program (not shown in the drawing) for carrying out optimization of job order which is stored in the ROM 102 is read out and executed, first, the CPU 101 determines whether a job input is requested by a PC or an operation unit of the image forming apparatus A or not (step S100). When the CPU 101 determines that the job input was requested (step S100:Y), the CPU 101 executes the job inputting process by reading out the job inputting program 102a (step s110), and when the CPU 101 determines that the job input is not requested (step S100: N), the CPU 101 finishes the process.

In the job inputting process, the CPU 101 carries out inputting by storing the contents of a plurality of jobs which are desired by an operator in the RAM 103 according to an inputting operation by an operator. In the job inputting process, the CPU 101 identifiably stores the input order of the plurality of jobs according to the inputting operation of an operator.

Next, the CPU 101 executes the job specifying process by reading out the job specifying program 102b (step S120). In the job specifying process, the CPU 101 specifies whether the job is job type 1 in which the above described applying process by the applying unit 40C is needed or job type 2 in which the applying process by the applying unit 40C is not needed for each of the plurality of jobs which are inputted in step S110.

Next, the CPU 101 determines whether the job type 1 and the job type 2 are mixed or not with regards to the plurality of jobs which are inputted in step S110 (step S130).

When the CPU 101 determines that the job type 1 and the job type 2 are mixed (step S130: Y), the CPU 101 transmits a command information for requesting warm-up completion time information to the bookbinding apparatus C (step S140). On the other hand, when the CPU 101 does not determine that the job type 1 and the job type 2 are mixed, that is, when the CPU 101 determines that only either of the job type 1 or the job type 2 are inputted (step S130: N), the process moves to step S170 because there is no need to change the order of the jobs.

In step S140, the CPU 101 determines whether the warm-up completion time information is received from the bookbinding apparatus C after transmitting the command information (step S150), and the CPU 101 repeatedly executes this process until the warm-up completion time information is received.

Next, the CPU 101 reads out the job order deciding program 102*d* and executes the job order deciding process (step S160). Although it will be described in detail later, in the job order deciding process, the CPU 101 carries out a process to switch the execution order of jobs so that the jobs are to be efficiently executed even during the warm-up.

Next, the CPU 101 determines whether job execution is requested by an operator operating a PC or an operation unit of the image forming apparatus or not (step S170). When the CPU 101 determines that the job execution is requested (step S170: Y), the CPU 101 finishes the process after executing the job execution process by reading out the job execution program 102*e* (step S180). On the other hand, when the CPU 101 does not determine that the job execution is requested (step S170: N), the CPU 101 moves to the process of step S190.

In the job execution process, the CPU 101 controls so as to orderly execute the plurality of jobs in the execution order which is decided in step S110 or step S160.

The CPU 101 determines whether an inputting operation for adding a new job or for cancelling any of the jobs among the plurality of jobs which are inputted in step S110 is carried out by an operator by a PC or an operation unit of the image forming apparatus or not in step S190. When it is determined that the inputting operation for adding or cancelling a job was carried out (step S190: Y), the CPU 101 moves to the process of step S110 and redo the job inputting process. On the other hand, when it is not determined that the inputting operation for adding or cancelling a job was carried out (step S190: N), the CPU 101 moves to the process of step S170.

Next, the job order deciding process which is executed in step S160 will be described with reference to FIG. 7.

The CPU 101 executes the combination pattern extracting process by reading out the combination pattern extracting program 102*f* (step S601). In the combination pattern extracting process, the CPU 101 extracts a plurality of combination patterns of one or a plurality of jobs of job type 2. For example, when three jobs of job type 2 (job x, job y, job z) are inputted in step S110, total of six patterns which are a combination pattern of job x alone, a combination pattern of job x and job y, a combination pattern of job x, job y and job z, a combination pattern of job y alone, a combination pattern of job y and job z and a combination pattern of job z alone are extracted.

Next, the CPU 101 executes the processing time specifying process by reading out the processing time specifying program 102*c* (step S602). In the processing time specifying process, as described above, the CPU 101 calculates a processing expected time which is a time needed from execution start to execution completed of a job of job type 2 for each job. Then, the CPU 101 calculates a processing expected total time of the jobs which constitutes a pattern for each of the combination patterns extracted in step S601.

Next, the CPU 101 calculates a difference (t) of the warm-up completion time which is specified from the warm-up completion time information received in step S150 and the processing expected total time of the combination pattern calculated in step S603 for each of the combination patterns (step S603).

Then, the CPU 101 extracts combination patterns in which the value (t) calculated in step S603 is 0 or smaller (step S604). That is, the CPU 101 extracts combination patterns in which the processing expected total time is equal to or greater than the warm-up completion time.

Next, the CPU 101 compares the user-set time which is set in advance by an operator to the value (t) which is calculated in step S603 for each of the combination patterns which are extracted in step S604 (step S605). The user-set time is a delay time that is difference between base-timing and optimize-timing of starting the job which needs warm-up. This time is effective to cut no-action time in the image forming apparatus. Here, the user-set time can be set by an operator arbitrarily, and for example, can be selected within a range of 0 to −5.

Then, as a result of comparison in step S605, the CPU 101 extracts the pattern in which the difference of the user-set time and the value (t) is the smallest (step S606).

Next, the CPU 101 determines whether there are two or more combination patterns which are extracted in step S606 or not (step S607). That is, the CPU 101 determines whether a plurality of combination patterns in which the difference of the user-set time and the value (t) is the smallest and is the same exists or not. When the CPU 101 determines that there exists two or more of the above combination pattern (step S607: Y), the CPU 101 moves to the process of step of S608. On the other hand, when the CPU 101 does not determine that there exist two or more of the above combination pattern (step S607: N), the CPU 101 moves to the process of step S611. That is, the combination pattern which is extracted finally in step S606 is decided as the combination pattern of jobs of job type 2 (the second job) which is to be executed in preference to jobs of job type 1 (the first job), and the finally decided combination pattern is to be processed in step S611.

In step S608, the CPU 101 determines whether the optimization condition which is set in advance by an operator is to prioritize the number of interruptions or not (step S608). As described above, in the optimization condition, either to make the number of jobs of job type 2 which are to be preferentially executed be greatest or to preferentially execute at least the job of job type 2 which is ahead in the input order can be selected by the CPU 101 reading out and executing the function selecting program 102*i* according to an operator carrying out a predetermined operation by a PC or the image forming apparatus.

When the CPU 101 determines that the optimization condition is to prioritize the number of interruptions (step S608: Y), the CPU 101 reads out and executes the first combination pattern selecting program 102*g* (step S609). That is, the CPU 101 executes the process for selecting the combination pattern which includes the most number of jobs of job type 2 among the two or more combination patterns extracted in step S606.

On the other hand, when the CPU 101 does not determine that the optimization condition is to prioritize the number of interruptions, that is, when the CPU 101 determines to make the job of job type 2 which is registered first interrupt preferentially (step S608: N), the CPU 101 reads out and executes the second combination pattern selecting program 102*h* (step S610). That is, the CPU 101 executes a process to select the combination pattern which includes the job of job type 2 which is ahead in the input order within the jobs inputted in step S110 among the two or more combination patterns extracted instep S606. Here, when a combination pattern which includes the job of job type 2 which is ahead in the inputting order does not exist, the CPU 101 selects a combination pattern which includes the job of job type 2 which is next in the input order.

Next, with respect to the jobs inputted in step S110, the CPU 101 carries out a process to place the job of job type 2 included in the combination pattern which is finally selected in step s606, step S609 or step S610 at the top (step S611).

By the above process, when jobs of job type 2 are inputted, the jobs of job type 2 are to be executed in preference to jobs of job type 1 until the warm-up time elapses even during the warm-up. Therefore, the inputted jobs are to be completed faster and energy cost and personal cost can be reduced, and this is efficient.

How the final order of jobs is decided after inputting of the jobs is carried out by an operator in the image forming system SY structured as above will be described with reference to FIGS. 8 to 12.

First, as shown in FIG. 8A, inputting of five jobs which are jobs a to e is carried out by an operator. Then, as shown in FIG. 8B, job type of the jobs a to e are determined. That is, jobs in which the applying process by the applying unit 40C is to be carried out is set to job type 1 and jobs in which the applying process is not to be carried out is set to job type 2, and the type of each of the jobs a to e are to be recognizable by the existence of a flag, for example.

Next, because the jobs inputted here are mix of both of job type 1 an job type 2, combination patterns of job type 2 are extracted after obtaining warm-up completion time information from the bookbinding apparatus C. That is, as shown in FIG. 9, because the jobs inputted here include three jobs which are job type 2 (job b, job d, job e), combination pattern to be extracted are six patterns which are a combination pattern of job b alone (combination 1), a combination pattern of job b and job d (combination 2), a combination pattern of job b, job d and job e (combination 3), a combination pattern of job d alone (combination 4), a combination pattern of job d and job e (combination 5) and a combination pattern of job e alone (combination 6).

Next, the processing expected time is calculated for each of the jobs in the extracted combination patterns, and also, the processing expected total time is calculated for each of the combination patterns. For example, as shown in FIG. 9, the processing expected time for job b is calculated as 12 minutes, the processing expected time for job d is calculated as 3 minutes and the processing expected time for job e is calculated as 9 minutes in the combination 3, and the processing expected total time for the combination 3 is calculated as 24 minutes.

Here, the processing expected time is not limited to be calculated at the above timing, and for example, as shown in FIG. 8C, the processing expected time may be calculated when the jobs are inputted for all of the jobs.

Then, the difference of the warm-up completion time and the processing expected total time is calculate, and a combination pattern in which the processing expected total time is greater than the warm-up completion time is extracted. As shown in FIG. 9, the combination patterns in which the warm-up completion time is greater than the processing expected total time are four patterns of combination 1, combination 2, combination 3 and combination 5, and these four patterns are to be extracted.

Next, a combination pattern in which the difference of the warm-up completion time and the processing expected total time is closest to the user-set time difference which is set in advance by an operator is to be extracted. As shown in FIG. 10, the combination patterns in which the difference of the warm-up completion time and the processing expected total time is closest to the user-set time difference are two patterns of combination 1 and combination 5, and these two patterns are to be extracted.

Here, as shown in FIG. 11, because there are two or more combination patterns which are extracted, either one of the combination pattern is to be selected finally according to the optimization condition which is set in advance by an operator. For example, when the optimization condition is set so as to prioritize the number of interruptions, the combination 5 which includes the most number of jobs of job type 2 is selected finally. On the other hand, when the optimization condition is set so as to prioritize the job of job type 2 which is set first, the combination 1 which includes job b is selected finally.

Figure 12A:
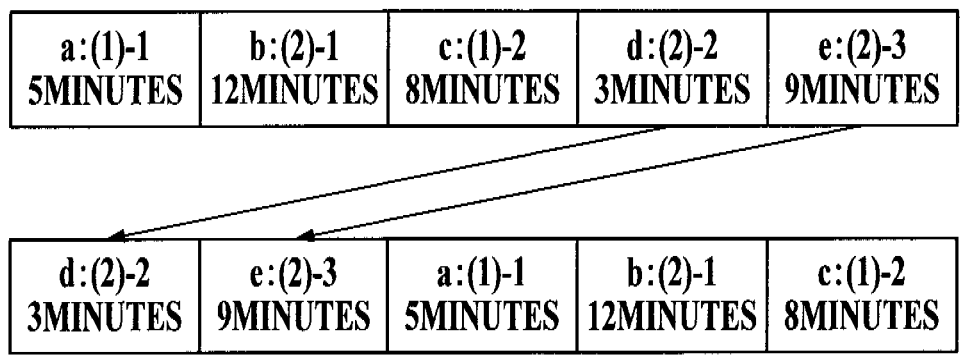
FIG. 12A is a diagram for explaining the process for deciding the execution order of jobs.
Figure 12B:
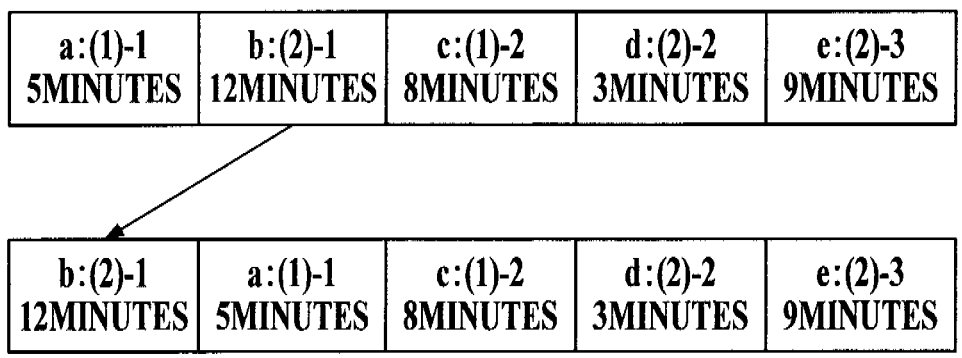
FIG. 12B is a diagram for explaining the process for deciding the execution order of jobs.

Further, based on the combination pattern which is selected finally, the execution order of the jobs is reordered. For example, when combination 5 is selected, as shown in FIG. 12A, job d and job e are respectively placed at first and second and the other jobs are slid down to later places. Furthermore, when combination 1 is selected, as shown in FIG. 12B, job b is placed first and job a is slid down at a place after job b.

The jobs are to be orderly executed in the order decided finally as described above.

Next, the second embodiment of the present invention will be described.

Figure 13:
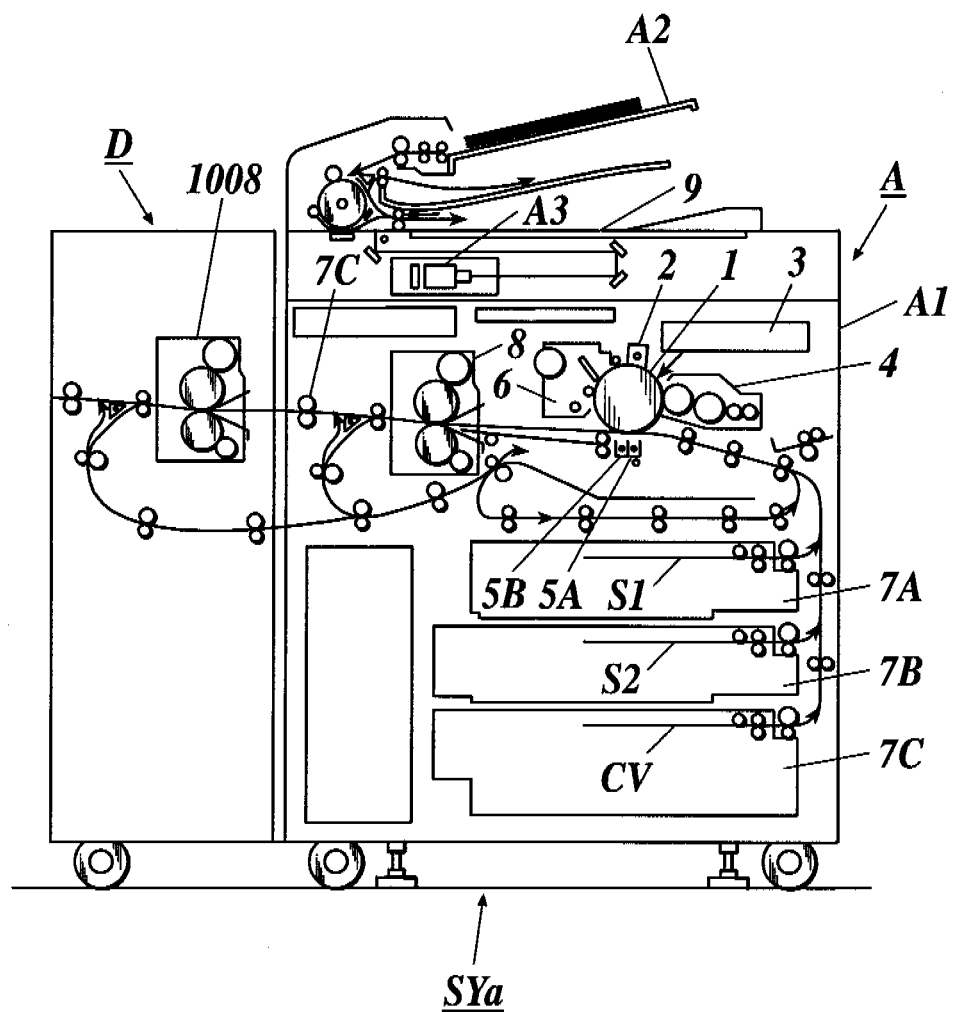
FIG. 13 is an overall configuration diagram of an image forming system of other embodiment.

In the image forming system SYa of the embodiment, the second fixing apparatus D is disposed instead of the sheet processing apparatus FS of the first embodiment as shown in FIG. 13.

Here, only the second fixing apparatus D will be described, and the description of the image forming apparatus A will be omitted because the description is the same as that of the first embodiment.

The second fixing apparatus D includes a second fixing unit 1008. The second fixing unit 1008 is for further fixing the toner image formed on the sheet S1 and the like which is ejected from the image forming apparatus A. For example, the second fixing process by the second fixing unit 1008 is carried out selectively according to paper quality, and a fixing roller of the second fixing unit 1008 is to be heated according to the execution of the second fixing process.

The second fixing unit 1008 including the fixing roller is also a processing device in which warm-up is needed when the second fixing process is to be executed. That is, a sufficient time (for example, 5 to 10 minutes) is needed until the fixing roller is heated to a sufficient temperature. Therefore, similarly to the first embodiment, by executing the jobs in which the second fixing process is not executed in preference to the jobs in which the second fixing process is executed during the above heating time, the process can be efficient.

As described above, according to the embodiments, the CPU 101 specifies the time needed until the warm-up of the applying unit 40C is completed. Then, the CPU 101 inputs jobs according to a predetermined inputting operation by an operator. Thereafter, with respect to the imputed jobs, the CPU 101 specifies whether the job is the first job in which the applying process by the applying unit 40C is needed or the second job in which the applying process is not carried out. Then, the CPU 101 specifies the processing time of the second jobs. Thereafter, the CPU 101 decides the execution order of the plurality of jobs so that the second jobs are to be executed in preference to the first jobs until the warm-up completion time elapses from the start of job execution. As a result, an inefficient situation where the second jobs are not executed during the warm-up even though unexecuted second jobs are inputted does not occur and the entire jobs to be executed can be carried out efficiently. Therefore, the overall efficiency can be enhanced and productivity is improved.

Moreover, according to the embodiments, when a plurality of the second jobs are inputted, the CPU 101 extracts a plurality of combination patterns of one or a plurality of second jobs. Further, the CPU 101 specifies the total processing time for each of all of the combination patterns which are extracted. Thereafter, the CPU 101 selects the combination pattern in which the specified total processing time satisfies the condition set based on the warm-up completion time among all of the extracted combination patterns. Then, the CPU 101 decides the execution order of the plurality of jobs so that one or a plurality of the second jobs which correspond to the selected combination pattern are executed in preference to other jobs. As a result, the execution order of jobs is decided by the condition which is set based on the warm-up completion time. Therefore, for example, convenience can be enhanced such that the first jobs can be executed as soon as possible after the warm-up.

Moreover, according to the embodiments, the CPU 101 selects the combination pattern which includes the most number of second jobs when there are a plurality of combination patterns in which the specified total processing time satisfies the condition set based on the warm-up completion time, among all of the extracted combination patterns. As a result, as much of the second jobs can be completed during the warm-up. Therefore, for example, much of other operations such as sorting and packaging can be carried out while the first jobs are being executed after completion of warm-up. Thus, operation can be completed faster and productivity can be improved.

Moreover, according to the embodiments, the CPU 101 sets the input order of jobs according to an inputting operation by an operator. Then, the CPU 101 selects the combination pattern which includes the second job which is ahead in the input order based on the input order of jobs when there are a plurality of combination patterns in which the specified total processing time satisfies the condition set based on the warm-up completion time, among all of the extracted combination patterns. As a result, the jobs can be executed according to the order of inputting of the jobs by an operator as much as possible. Therefore, overall efficiency can be enhanced, and also, the jobs can be executed by the execution order of the jobs desired by an operator to a certain extent. Thus, this is convenient.

Moreover, according to the embodiments, the CPU 101 sets the input order of jobs according to the inputting operation by an operator. Then, the CPU 101 selects the combination pattern which includes the most number of second jobs or the combination pattern which includes the second job which is ahead in the input order based on the input order of the jobs according to a selecting operation of an operator when there are a plurality of combination patterns in which the specified total processing time satisfies the condition set based on the warm-up completion time, among all of the extracted combination patterns. As a result, a function is selected according to an operator and operation content. Therefore, this is more convenient for an operator.

Moreover, according to the embodiments, the CPU 101 allows additional input of a job even after the execution order of jobs is decided. Then, the CPU 101 re-decides the execution order of jobs when an additional input of a job is carried out. As a result, a confusing control is unnecessary, and processing burden can be reduced.

Here, in the embodiments, the input order of jobs is decided along with the operation of an operator in time of job input. However, the mode can be set so as not to decide job order.

Further, in the embodiments, the combination pattern in which the processing expected total time is closest to the time in which the user-set time is added to the warm-up completion time is indicated as the condition set based on the warm-up completion time. However, the combination pattern in which the processing expected total time is greater than the warm-up completion time and closest to the warm-up completion time may be indicated as the condition set based on the warm-up completion time. Furthermore, the combination pattern in which the processing expected total time is greater than the warm-up completion time and within the time in which the user-set time is added to the warm-up completion time may be indicated as the condition set based on the warm-up completion time.

Moreover, in the embodiments, it is structured so that either to prioritize the number of interruptions of jobs or to prioritize the second job which is ahead in the input order can be selected according to the selecting operation of an operator when there are a plurality of combination patterns which satisfies the condition set based on the warm-up completion time. However, the mode can be such that only including either one of the above functions without having the above selecting function.

Further, in the embodiments, a job can be added or cancelled even after the execution order of the jobs is decided. However, it may be structured so that a job cannot be added or cancelled.

Furthermore, in the embodiments, the applying unit and the second fixing unit are exemplified and described as processing devices. However, the present invention can be applied to any device as long as it is a processing device which requires warm-up. For example, the present invention can be applied to a binding unit in which one side of a bundle of sheets is to be adhered by a binding tape. Because a binding tape in which an adhesive of hot-melt type is applied is used in the binding unit, the binding tape needs to be adhered to the bundle of sheets while being heated by a heating unit. Therefore, warm-up is needed in order to heat the heating unit in advance and the binding process cannot be carried out during the warm-up time. However, by applying the present invention, jobs in which the binding process is not carried out can be preferentially executed during the warm-up.

Moreover, the applying unit and the second fixing unit as the processing device in the embodiments are disposed as a unit separated from the image forming apparatus main body. However, the above processing devices may be disposed in the image forming apparatus main body.

Further, in the embodiments, an example in which a non-volatile memory or the like such as a hard disk or a semiconductor is used as a computer readable medium of a program according to the present invention is disclosed. However, it is not limited to the above example. A portable recording medium such as a CD-ROM or the like can be applied as other computer readable medium. Furthermore, a carrier wave is applied as a medium for providing data of a program of the present invention via a communication circuit.

The entire disclosure of Japanese Patent Application No. 2009-241933 filed on Oct. 21, 2009 is incorporated herein by reference in its entirety.

What is claimed is:

1. A processing device to carry out a predetermined process to a sheet in which an image is formed, the processing device requiring a warm-up of a predetermined time;

a control unit to specify a warm-up completion time which is a time needed until the processing device completes the warm-up, to input a plurality of jobs according to a predetermined inputting operation of an operator, to specify whether the inputted job is a first job in which a process by the processing device is needed or a second job in which the process by the processing device is not carried out with regards to the inputted jobs, to specify a processing time of the second job which is inputted, and to decide an execution order of the plurality of jobs so that the second job is to be executed in preference to the first job until the warm-up completion time elapses from start of a job execution when the control unit determines that the processing time of the second job is greater than the warm-up completion time; and an image forming unit to orderly execute the jobs according to the execution order of the plurality of jobs which is decided by the control unit, wherein when a plurality of the second jobs are inputted, the control unit extracts a plurality of combination patterns of one or a plurality of the second jobs and specifies a total processing time for each of all of the extracted combination patterns, the control unit selects a combination pattern in which the total processing time satisfies a condition set based on the warm-up completion time among all of the extracted combination patterns, and the control unit decides an execution order of the plurality of jobs so that the one or the plurality of the second jobs corresponding to the selected combination pattern is executed in preference to other jobs.

2. The image forming apparatus of claim 1, wherein when there exist a plurality of combination patterns in which the total processing time satisfies the condition set based on the warm-up completion time within all of the extracted combination patterns, the control unit selects a combination pattern which includes the most number of the second jobs.

3. The image forming apparatus of claim 1, wherein the control unit sets an input order of the jobs according to an inputting operation of the operator, and when there exist a plurality of combination patterns in which the total processing time satisfies the condition set based on the warm-up completion time within all of the extracted combination patters, the control unit selects a combination pattern which includes the second job which is ahead in the input order based on the input order of the jobs.

4. The image forming apparatus of claim 1, wherein the control unit sets an input order of the jobs according to an inputting operation of the operator, and when there exist a plurality of combination patterns in which the total processing time satisfies the condition set based on the warm-up completion time within all of the extracted combination patters, the control unit selects a combination pattern which includes the most number of the second jobs or a combination pattern which includes the second job which is ahead in the input order based on the input order of the jobs according to a selecting operation of the operator.

5. The image forming apparatus of claim 1, wherein the control unit allows an additional input of a job even after the execution order of the jobs is decided and re-decides the execution order of the jobs when the additional input of the job is carried out.

6. A control method of an image forming apparatus including a processing device to carry out a predetermined process to a sheet in which an image is formed, which requires a warm-up of a predetermined time, comprising:

specifying a warm-up completion time which is a time needed until the warm-up of the processing device is completed;

inputting a plurality of jobs according to a predetermined inputting operation of an operator;

specifying whether the inputted job is a first job in which a process by the processing device is needed or a second job in which the process by the processing device is not carried out with regards to the inputted jobs and specifying a processing time of the second job which is inputted;

deciding an execution order of the plurality of jobs so that the second job is to be executed in preference to the first job until the warm-up completion time elapses from start of a job execution when the control unit determines that the processing time of the second job is greater than the warm-up completion time; and orderly executing the jobs according to the execution order of the plurality of jobs which is decided, wherein when a plurality of the second jobs are inputted, a plurality of combination patterns of one or a plurality of the second jobs are extracted and a total processing time for each of all of the extracted combination patterns is specified, a combination pattern in which the total processing time satisfies a condition set based on the warm-up completion time is selected among all of the extracted combination patterns, and an execution order of the plurality of jobs is decided so that the one or the plurality of the second jobs corresponding to the selected combination pattern is executed in preference to other jobs.

7. The control method of claim 6, wherein when there exist a plurality of combination patterns in which the total processing time satisfies the condition set based on the warm-up completion time within all of the extracted combination patterns, a combination pattern which includes the most number of the second jobs is selected.

8. The control method of claim 6, wherein an input order of the jobs is set according to an inputting operation of the operator, and when there exist a plurality of combination patterns in which the total processing time satisfies the condition set based on the warm-up completion time within all of the extracted combination patters, a combination pattern which includes the second job which comes is ahead the input order based on the input order of the jobs is selected.

9. The control method of claim 6, wherein an input order of the jobs is set according to an inputting operation of the operator, and when there exist a plurality of combination patterns in which the total processing time satisfies the condition set based on the warm-up completion time within all of the extracted combination patterns, a combination pattern which includes the most number of the second jobs or a combination pattern which includes the second job which is ahead in the input order based on the input order of the jobs is selected according to a selecting operation of the operator.

10. The control method of claim 6, wherein
an additional input of a job is allowed even after the execution order of the jobs is decided, and
the execution order of the jobs is re-decided when the additional input of the job is carried out.

11. An image forming apparatus, comprising:
a processing device to carry out a predetermined process to a sheet in which an image is formed, the processing device requiring a warm-up of a predetermined time; and
a control unit configured to perform the following operations:
specifying a warm-up completion time required until the processing device completes the warm-up;
inputting a plurality of jobs according to inputting operation by an operator;
setting an input order of the jobs according to the inputting operation by the operator;
specifying whether the inputted job is a first job in which a process by the processing device is needed or a second job in which the process by the processing device is not carried out for the inputted job;
extracting a plurality of combination patterns of one or a plurality of the second jobs;
specifying a total processing time for each of the extracted combination patterns;
selecting a combination pattern in which the total processing time satisfies a condition set based on the warm-up completion time among all of the extracted combination patterns;
further selecting only one combination pattern of a combination pattern which includes the most number of the second jobs and a combination pattern which includes the second job which is ahead in an input order based on an input order of the jobs according to the inputting operation when there exist a plurality of combination patterns in which the total processing time satisfies the condition set based on the warm-up completion time within all of the extracted combination patterns; and
deciding an execution order of the plurality of jobs so that the one or the plurality of the second jobs corresponding to the selected combination pattern is executed in preference to the first jobs.

* * * * *